US007933606B2

United States Patent
Frederiksen et al.

(10) Patent No.: US 7,933,606 B2
(45) Date of Patent: Apr. 26, 2011

(54) MULTI-LEVEL CONTROL FOR MEASUREMENT REPORTS

(75) Inventors: Frank Frederiksen, Klarup (DK); Troels Kolding, Klarup (DK)

(73) Assignee: Nokia Corporation, Espoo (FI)

( * ) Notice: Subject to any disclaimer, the term of this patent is extended or adjusted under 35 U.S.C. 154(b) by 718 days.

(21) Appl. No.: 11/583,002

(22) Filed: Oct. 19, 2006

(65) Prior Publication Data

US 2008/0004030 A1    Jan. 3, 2008

(30) Foreign Application Priority Data

Jun. 30, 2006  (EP) .................................... 06013618

(51) Int. Cl.
*H04W 72/10* (2009.01)
*H04W 24/10* (2009.01)

(52) U.S. Cl. ............. 455/450; 455/456.1; 455/457; 455/437; 455/552.1; 370/322; 370/252

(58) Field of Classification Search ............ 370/322, 370/252; 455/67, 437, 522, 452, 63, 69
See application file for complete search history.

(56) References Cited

U.S. PATENT DOCUMENTS

| | | | |
|---|---|---|---|
| 6,038,450 A * | 3/2000 | Brink et al. .................. 455/442 |
| 6,826,390 B1 * | 11/2004 | Tamura ...................... 455/226.1 |
| 7,260,405 B2 * | 8/2007 | Kim et al. ................... 455/452.2 |
| 7,392,014 B2 * | 6/2008 | Baker et al. ................ 455/67.11 |
| 2002/0060995 A1 * | 5/2002 | Cervello et al. ............... 370/332 |
| 2003/0114127 A1 * | 6/2003 | Baldwin ..................... 455/245.1 |
| 2003/0123396 A1 * | 7/2003 | Seo et al. ....................... 370/252 |
| 2005/0260998 A1 * | 11/2005 | Casaccia et al. ........... 455/452.2 |
| 2006/0014542 A1 * | 1/2006 | Khandekar et al. ........... 455/447 |
| 2006/0014548 A1 * | 1/2006 | Bolin et al. ................. 455/456.1 |
| 2006/0057965 A1 * | 3/2006 | Braun et al. ............... 455/67.11 |
| 2006/0072508 A1 * | 4/2006 | Zou et al. ...................... 370/332 |
| 2006/0089104 A1 * | 4/2006 | Kaikkonen et al. ........ 455/67.13 |
| 2006/0160556 A1 * | 7/2006 | Mueller et al. ................ 455/522 |
| 2007/0133476 A1 * | 6/2007 | Li et al. ......................... 370/335 |
| 2007/0286066 A1 * | 12/2007 | Zhang et al. .................. 370/208 |
| 2007/0298728 A1 * | 12/2007 | Imamura et al. ................ 455/77 |
| 2009/0147869 A1 * | 6/2009 | Duan et al. .................... 375/260 |

* cited by examiner

*Primary Examiner* — Nick Corsaro
*Assistant Examiner* — Mahendra R Patel
(74) *Attorney, Agent, or Firm* — Squire, Sanders & Dempsey (US) LLP

(57) ABSTRACT

The present invention relates to a method, terminal device, network element, system and computer program product for handling measurement reports in a communication network. At least two different levels of measurements reports (15) are provided, wherein each of the at least two levels corresponds to a different amount of resource blocks on which the measurement reports are based. The level of a received measurement report (15) is detected and a compensation offset is selected based on the detection result and applied to the measurement report. Thereby, measurement errors and biases of the measurement reports can be dynamically corrected in multi-level reporting schemes.

16 Claims, 2 Drawing Sheets

MULTI-LEVEL CONTROL FOR MEASUREMENT REPORTS

FIELD OF THE INVENTION

The present invention relates to a method, terminal device, network element, system, and computer program products for handling measurement reports in a communication network.

BACKGROUND OF THE INVENTION

Mobile communication systems are being standardized to implement efficient and high throughput of downlink (DL) packet data transfer mechanisms. In the context of universal mobile telecommunications system (UMTS), the current working assumption in 3GPP ($3^{rd}$ Generation Partnership Project) is that the access technique for the enhanced UTRAN (E-UTRAN) will be orthogonal frequency division multiplexing (OFDM), which will open for the opportunity to do link adaptation and user multiplexing in the frequency domain.

In order to be able to do this adaptation in the frequency domain, it is crucial that the packet scheduler and link adaptation units in the base station, hereinafter designated as "Node B" in line with UMTS terminology, have knowledge of the instantaneous channel quality. This is obtained through the signalling of channel quality indication (CQI) reports from the different wireless transmit and receive units, hereinafter designated as "user equipment (UE)" in line with UMTS terminology.

A method of how to derive the reported CQI value has been standardized. In the FDD (Frequency Division Duplex) standard, there is a table (as shown in 3GPP TS 25.321, Medium Access Control (MAC) Protocol Specification, 5.4.0 (2003-03)) listing some 30 CQI values roughly corresponding to increasingly higher data rates, and therefore proportional to higher and higher DL signal-to-interference ratios (SIRs). The reported CQI in FDD is derived as follows (per 3GPP TS 25.214, Physical layer procedures (FDD), v5.4.0 (2003-03), section 6A.2): "the UE shall report the highest tabulated CQI value for which a single HS-DSCH sub-frame formatted with the transport block size, number of HS-PDSCH codes and modulation corresponding to the reported or lower CQI value could be received in a 3-slot reference period ending 1 slot before the start of the first slot in which the reported CQI value is transmitted and for which the transport block error probability would not exceed 0.1." In the TDD (Time Division Duplex) standard, reporting is different; the transport block size is reported if it was transmitted during the last received transmission interval and that transmission would have yielded a block error rate (BLER) of 0.1.

As an example, in the W-CDMA FDD specification, the CQI is an information bit sequence five bits long which is encoded by means of a (20, 5) Reed-Muller code. The resulting 20 bit long coded sequence is sent in the UL on a High-Speed Dedicated Physical Control Channel (HS-DPCCH). Every user has a separate HS-DPCCH with an adjustable CQI reporting cycle (feedback rate). A user can report the CQI on the HS-DPCCH even if the user does not receive data on the HS-DSCH.

As another example, in the W-CDMA TDD specification, the CQI is an information bit sequence ten bits long which is encoded by means of a (32, 10) Reed-Muller code. The resulting 32 bit long coded sequence is sent in the UL as part of the HS-SICH (High-Speed Signaling Channel). With current TDD, a CQI transmission can only take place if the user has previously received data on the HS-DSCH in the frame.

However, there will be measurement errors and potential bias values related to the received CQI values. This problem has been handled by using an outer loop algorithm to compensate for this issue.

An outer loop link adaptation mechanism based on the ACKs/NACKs from past transmissions has been proposed in D. W. Paranchych and M. Yavuz, "A method for outer loop rate control in high data rate wireless networks," in Proceedings of the IEEE Conference on Vehicular Technology, September 2002, and in M. Nakamura, Y. Awad, and S. Vadgama, "Adaptive control of link adaptation for high speed downlink packet access (HSDPA) in W-CDMA," in Proceedings of the $5^{th}$ International Symposium (WPMC'2002). Such a mechanism can be realized by introducing a continuously adjusted CQI offset value, for instance, which is subtracted from all received CQI values in the Node B before an appropriate modulation and coding scheme (MCS) is selected. This can be applied on a per-user level as well as on a per cell level, while the default operation is on a per-user level. Thereby, it is possible to actively control the residual frame error rate after a certain number of retransmission attempts.

Furthermore, the US20060089104 discloses a methodology for improving a high speed downlink shared channel (HS-DSCH) transport format allocation in communication systems (e.g., mobile phone networks) using, e.g., a network element such as a Node B. As CQI reports made by a user terminal, such as a UE, are time stamped in a sense that they correspond to a given reference period, the Node B is able to determine what time instant in the past the given CQI report corresponds to. As the Node B scheduler knows a history of HS-DSCH (high speed downlink shared channel) transmission, it is able to determine how much HS-DSCH power was transmitted during the time corresponding to the received CQI report. Based on this information, it determines the bias required to the CQI reports received at different times to improve an accuracy of the allocated HS-DSCH transport format. Additionally, uncertainty of the UE CQI reports can be partly compensated for by monitoring received ACK/NACK messages for previous transmissions. Hence, an allocated HS-DSCH transport format is either positively or negatively "biased" to adjust an ACK/NACK ratio towards a desired target. Thereby, accuracy of a current "outer loop" algorithm (based on the received ACK/NACK messages) can be improved, which leads to an improved HS-DSCH link adaptation and scheduling performance.

A promising CQI reporting method is to use a tree-based approach, which will rely on using time staggering and partial updates to gradually improve the frequency domain resolution as well as improving the observed measurement error. Thereby, the requirements for accuracy, flexibility, and low-signalling bandwidth can be met. However, a problem using this tree based approach is that the measurement error on the CQI reports will be dependent on the bandwidth as well as the time that the CQI has been measured over. This means that the approach of using a single outer loop algorithm to handle the potential errors made by CQI reporting might prove insufficient.

SUMMARY

It is therefore an object of the present invention to provide a method and system for improved handling of quality reports.

This object is achieved by a method of handling measurement reports received from a terminal device (10) of a communication network, said method comprising:

providing at least two different levels of said measurements reports, each of said at least two levels corresponding to a different amount of resource blocks on which said measurement reports are based;

detecting the level of a received measurement report; and applying to said received measurement report a compensation offset selected based on the result of said detecting step.

Additionally, the above object is achieved by a network element for handling measurement reports received from a terminal device of a communication network, said network element comprising:

detecting means for detecting a level of a received measurement report, said level indicating an amount of resource blocks on which said measurement report is based; and compensation means for applying to said received measurement report a compensation offset selected in response to said detecting means.

Accordingly, a multi-level outer loop control is applied to handle the fact that different levels in the tree-structure of measurement reports will have different amounts of measurement errors and potential bias values. Based on the amount of allocated resources and thus the level of the current measurement report, a time-varying compensation offset is applied to the received measurement reports before they are utilized for further processing, e.g., in packet scheduling and/or link adaptation. The measurement error correction can thus be adapted dynamically to the current situation.

A complete measurement report may be divided into sub-reports covering different ones of the resource blocks, wherein each of the at least two different levels covers a different number of the sub-reports. Hence, the level of a measurement report defines the number of sub-reports and resource blocks covered by the measurement. As a specific but non-limiting example, the measurement report may be a channel quality report.

The transmission in the communication network may be based for example on orthogonal frequency division multiplexing. Then, the resource blocks may correspond to groups of sub-carriers.

Optionally, at least one of the measurement reports may be used for making at least one of a scheduling and link adaptation decision. Then, the compensation offset may be used for mapping the measurement report into a signal-to-noise ratio.

As an additional option, a plurality of different compensation offset values may be provided or stored for the at least two different levels of said measurement reports. Thereby, the compensation offset can be adapted to different degrees of reliability associated with the different levels of measurement reports.

Further advantageous modifications are described in the dependent claims.

BRIEF DESCRIPTION OF THE DRAWINGS

The present invention will now be described in greater detail based on a preferred embodiment with reference to the accompanying drawings, in which.

DESCRIPTION OF THE PREFERRED EMBODIMENT

In the following, the preferred embodiment of the present invention will be described based on a CQI report handling scheme for a wireless connection between a mobile terminal and a base station device of a radio access network, such as evolved UTRAN (E-UTRAN) for example. However, needless to say that the skilled person will readily acknowledge or understand that the proposed concept of the preferred embodiment can be transferred to other measurement reporting schemes, as well.

Figure 1:
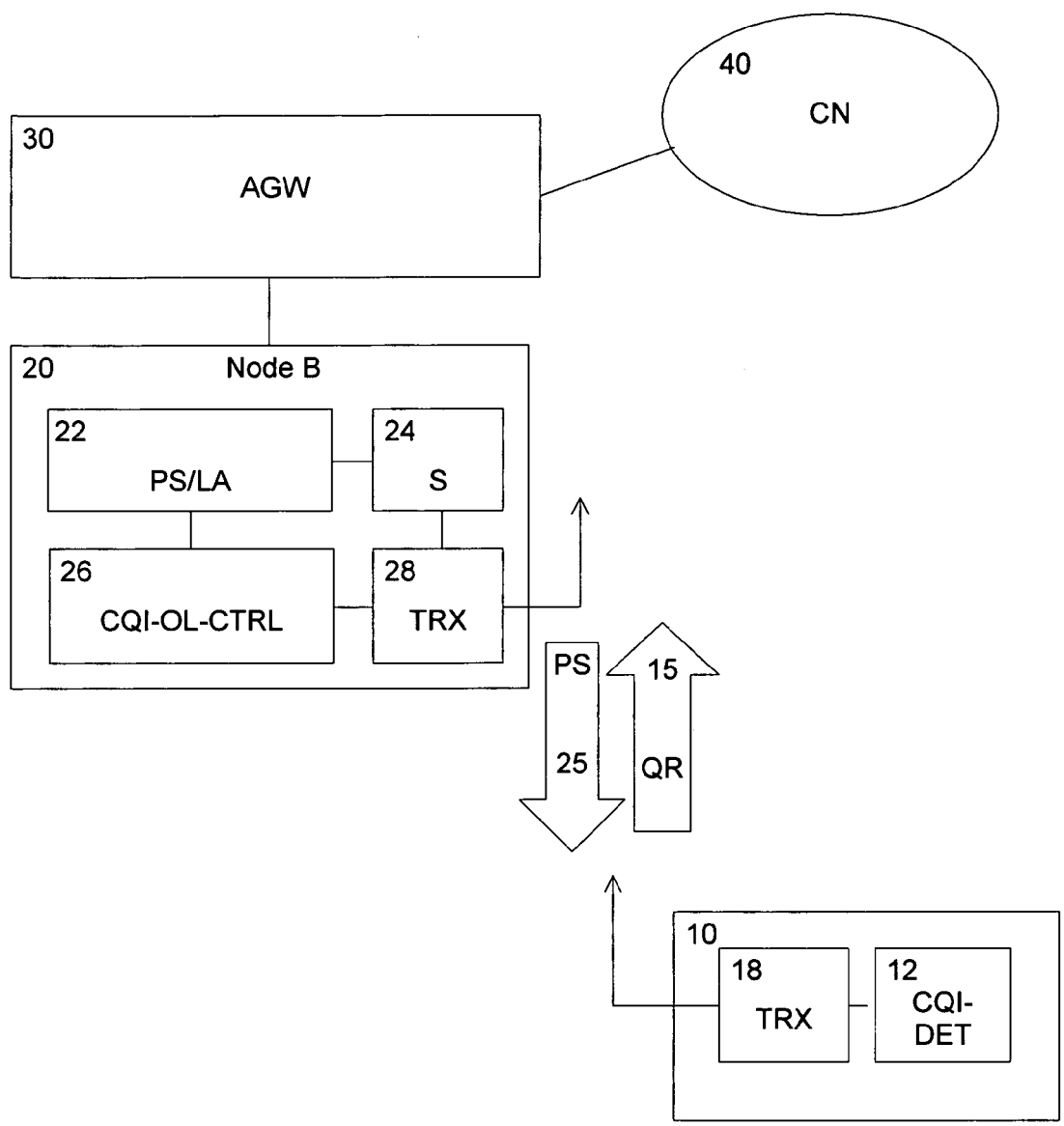
FIG. 1 shows a schematic block diagram of a network environment with a terminal device and a network element according to the preferred embodiment.

FIG. 1 shows schematic block diagrams of the mobile terminal or UE 10 and the base station device or Node B 20 which is connected via an access gateway (AGW) 30 of the radio access network to a core network (CN) 40. Both the UE 10 and the Node B 20 comprise respective transceiver (TRX) circuits 18, 28 for enabling transmission and reception of wireless signals. It is noted that the block diagrams of FIG. 1 only comprise those components required for understanding the report handling scheme according to the preferred embodiment. Other components have been omitted for reasons of simplicity.

According to the preferred embodiment, a multi-level outer loop mechanism is provided to handle the fact that different levels in a tree-structure of CQI measurement reports will have different amounts of measurement errors and potential bias values. The idea is to have each level in the tree such that it will have a time varying offset which is applied to the received CQI measurement reports, which will be applied before the CQI measurements are utilized in a packet scheduler/link adaptation unit 22 of the Node B 20.

For this purpose, the UE 10 comprises a CQI determination unit 12 which generates a CQI measurement report (QR) 15 of a predetermined level determined based on the amount of transmission resources currently allocated to the UE 10, as explained in the following.

Figure 2:
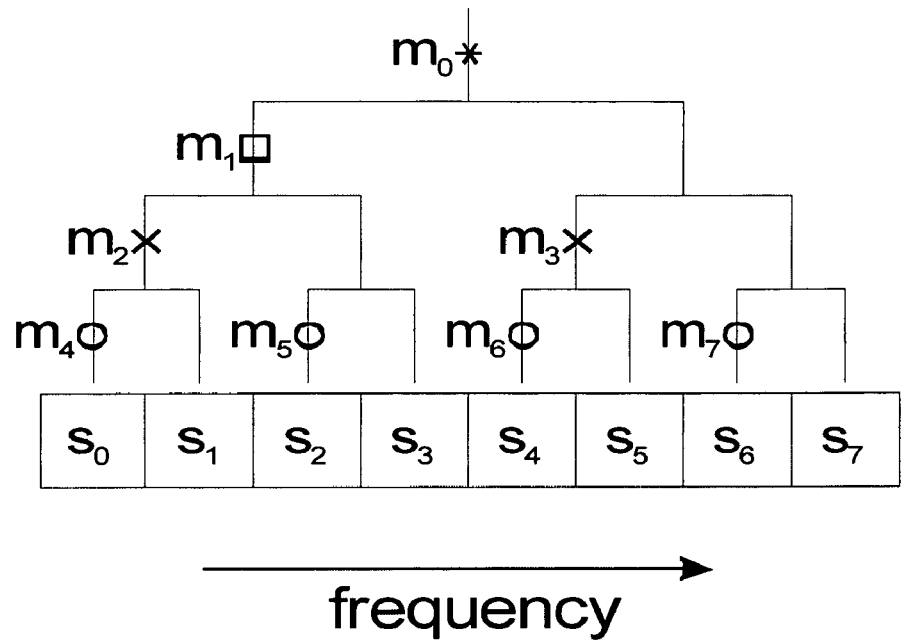
FIG. 2 shows an illustration of a tree-based structure of a set of measurement reports.

FIG. 2 shows an illustration of a tree-based structure of a set of measurement reports $m_0$ to $m_7$ which may be used in the preferred embodiment. In the example of FIG. 2, the complete CQI report is divided into eight sub-reports $S_0$-$S_7$, wherein each sub-report could for instance represent a group of sub-carriers, a so-called physical resource block, in the frequency domain. This example presents the situation where there are only eight resources (e.g. groups of sub-carriers of an OFDM system) reserved for signalling the CQI measurements. In LTE (Long Term Evolution) for the 5 MHz deployment, the number of available physical resource blocks will likely increase to twelve (assuming that there is an OFDM sub-carrier spacing of 15 kHz and that twenty-five adjacent sub-carriers are grouped into a single physical resource block). The proposed solution scales well with this number.

Now, to illustrate the potential problem of CQI measurement errors, the principle behind an example way of doing CQI measurements will be explained. Since the UE 10 will have to use some known reference signal to be able to estimate the channel quality reliably, the estimation is based upon a signal 25 that is transmitted from the Node B 20 using a pre-determined configuration (in terms of time, power, and frequency allocation). The signal that would normally be used for this is the pilot sequence (PS) which is needed to be able to estimate the channel transfer function. In 3GPP technical report TR 25.814, page 27, it has been proposed to use every $6^{th}$ sub-carrier for a pilot sequence, and this is sent during two out of the seven OFDM symbols provided within a single sub-frame for transmission using short cyclic prefix and two out of six OFDM symbols provided in the case of long prefix. It should be noted that this is a working assumption for the long term evolution of 3GPP, and might change later in the process. This means that the UE 10 estimating the CQI for a single sub-frame and single physical resource block will only have eight to ten pilot symbols to estimate the channel quality. However, if all pilot symbols within the frequency band are available for CQI estimation, the number of available pilot symbols will be significantly higher (2*200=400 pilot symbols available).

The above first situation corresponds to the measurement reports $m_4$ to $m_7$ at the nodes at the bottom of the tree of FIG. 2, which will have only one sub-report and thus only few pilot symbols for CQI estimation, while the latter corresponds to the measurement report $m_0$ at the top node of the tree, which will have all sub-reports $S_0$ to $S_7$ and thus many pilot symbols available for channel quality estimation.

Furthermore, according to FIG. 2, the measurement report $m_1$ covers sub-reports $S_0$ to $S_3$, and the measurement reports $m_2$ and $m_3$ cover sub-reports $S_0$ to $S_1$ and $S_4$ to $S_5$, respectively.

It can be shown that the error of the CQI measurements will be a normal distributed in the log-domain, and that the standard deviation of the estimation error scales as a function of the square root of the number of pilot symbols available. The standard deviation of the measurement error as a function of the position in the tree is shown in the following table (showing the setup for a 20 MHz system bandwidth):

| Tree level | Number of physical resource blocks covered | Std dev. of estimation error | Note |
|---|---|---|---|
| 1 | 48 | 0.31 | Top node of the tree |
| 2 | 16 | 0.53 | Tree split into 3 parts to create a set of clear sub-trees for the rest of the tree-structure |
| 3 | 8 | 0.75 | |
| 4 | 4 | 1.09 | |
| 5 | 2 | 1.58 | |
| 6 | 1 | 2.50 | Lower node of the tree-structure |

It should be noted that the values presented in the table only indicates the potential standard deviation of the measurement error when considering a single sub-frame. If it is allowed to increase the time window for the lower nodes in the tree, time averaging can be used to reduce the standard deviation, especially for the lower tree nodes. However, even though averaging is used here, there will still be a likely difference between different levels.

According to the preferred embodiment, an outer loop control mechanism is provided, which will operate on each level of the tree-based multi-level reporting structure of FIG. 2. The smart thing about the tree-based structure is that the Node B 20 can make a scheduling and link adaptation decision already after having received a partial CQI report, e.g., one of the measurement reports $m_1$ to $m_7$ of FIG. 2. That is, the decision can be made when knowing only the first or second tree levels. However, the reliability of the measurements is different, as can be gathered from the above table. If a decision is based on the first tree-level, the CQI measurement report $m_0$ is reliable to a larger extent than if the scheduling decision is based on a later tree level to achieve frequency domain scheduling gain. This means that when a user is scheduled according to the accurate measurement report at the top node of the tree, a certain adjustment value or compensation offset should be used to map the reported CQI value into an effective SINR (signal-to-noise-plus-interference ratio) or other signal-to-noise ratio (SIR) used for the packet scheduling and link adaptation. However, if only few resources are allocated to a given user, another correction value (which is probably larger) should be used for the mapping into a new effective SINR or SIR value.

To achieve this, a CQI outer loop control unit 26 is provided at the Node B 20 so as to perform the above compensation and supply the corrected control value, e.g. SINR or SIR value, to a packet scheduling and link adaptation unit 22 which control packet scheduling at a scheduling unit 24.

Figure 3:
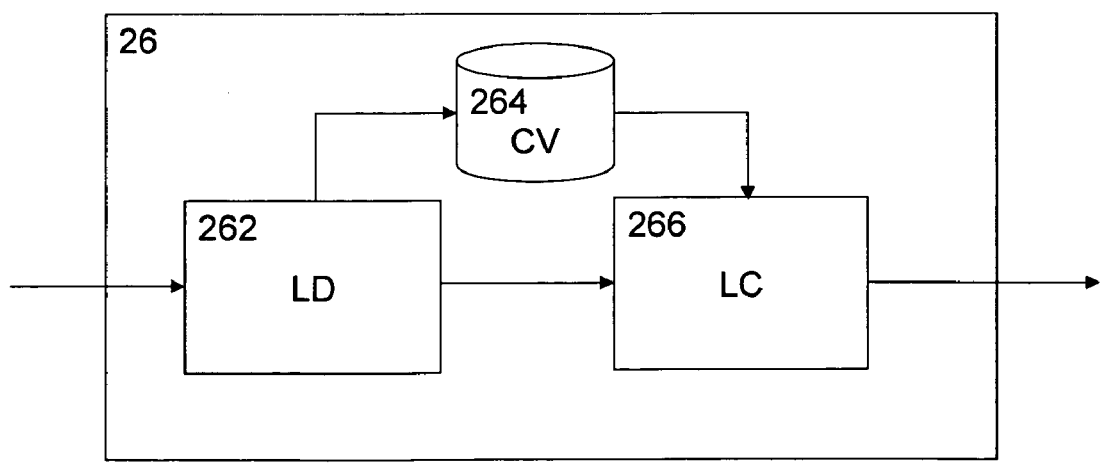
FIG. 3 shows a schematic block diagram of report handling unit according to the preferred embodiment.

FIG. 3 shows a schematic block diagram of the CQI outer loop control unit 26 which serves as a report handling unit in the preferred embodiment.

Measurement reports 15 received from the UE 10 are supplied to a level detection unit 262 which determines the tree-level of the measurement report. This may be achieved based on a corresponding information added to the measurement report, the length of the measurement report or any other detectable parameter. Based on the detected level of the measurement report, a corresponding compensation offset value is determined. This may be achieved by accessing a memory, storage, look-up table or database 264 which stores a plurality of compensation offset values in association with possible tree levels of the measurement reports. Of course, other possibilities or alternative can be used for deriving the compensation offset values, such as algorithms, a conversion arithmetic, or the like.

The derived offset compensation value is then applied to a level compensation unit 266 where the CQI value(s) of the CQI report is(are) corrected or adjusted based on the compensation offset value using a suitable processing or conversion algorithm for obtaining an adjusted SINR or SIR value. Thus, different CQI measurement compensation values can be used for different levels in the tree structure of the measurement reports. The adjustment at the level compensation unit 266 may be based on an algorithm, which is able to adjust different correction levels based on various pieces of feedback information (for instance considering the operating BLER for different types of allocations within the tree structure). The algorithm could be based on the outer loop link adaptation framework described in D. W. Paranchych and M. Yavuz, "A method for outer loop rate control in high data rate wireless networks," in Proceedings of the IEEE Conference on Vehicular Technology, September 2002, and in M. Nakamura, Y. Awad, and S. Vadgama, "Adaptive control of link adaptation for high speed downlink packet access (HSDPA) in W-CDMA," in Proceedings of the $5^{th}$ International Symposium (WPMC'2002), with the exception that the algorithm needs to operate for each level in the tree structure of the measurement reports.

It is clear that the functionalities of blocks 262, 264 and 266 of FIG. 3 may be implemented as programs or subroutines controlling a processor device or computer device of the Node B 20 to implement the required functionalities. Alternatively, implementation of the above functionalities may be achieved by discrete hardware circuits or units.

In summary, a method, terminal device, network element, system and computer program product for handling measurement reports in a communication network have been described, wherein at least two different levels of measurements reports are provided, and wherein each of the at least two levels corresponds to a different amount of resource blocks on which the measurement reports are based. The level of a received measurement report is detected and a compensation offset is selected based on the detection result and applied to the measurement report. Thereby, measurement errors and biases of the measurement reports can be dynamically corrected in multi-level reporting schemes.

Although the above preferred embodiment has been described in connection with an E-UTRAN environment, the present invention can be applied to any connection between a terminal device and a network element of any type of communication or data network. Although, in the preferred embodiment, only CQI has been addressed, it is apparent that the present invention can be applied to any measurement reporting scheme with different reporting levels. The preferred embodiments may thus vary within the scope of the attached claims.

The invention claimed is:

1. A method, comprising:
receiving, at a network element, at least two different levels of measurement reports from a terminal device, each of said at least two different levels corresponding to a different amount of resource blocks on which said measurement reports are based;
detecting, at the network element, the level of a received measurement report;
providing a plurality of different, compensation offset values for said at least two different levels of said measurement reports;
applying to said detected level of said received measurement report, by the network element, a compensation offset value selected based on a result of the detecting; and
dividing a complete measurement report into sub-reports covering different ones of said resource blocks, wherein each of said at least two different levels covers a different number of said sub-reports.

2. A method according to claim 1, wherein said measurement report is a channel quality report.

3. A method according to claim 1, wherein said resource blocks correspond to groups of sub-carriers of an orthogonal frequency division multiplexing transmission.

4. A method according to claim 1, further comprising using at least one of said measurement reports for making at least one of a scheduling and link adaptation decision.

5. A method according to claim 1, further comprising using said compensation offset for mapping said measurement report into a signal-to-noise ratio.

6. A method according to claim 1, wherein the compensation offset is a time-varying compensation offset.

7. An apparatus, comprising:
a detector configured to detect at least two different levels of measurement reports received from a terminal device of a communication network, each of said at least two levels corresponding to a different amount of resource blocks on which said measurement report is based; and
a compensator configured to apply to each level of said received measurement reports a compensation offset value selected in response to the detecting,
wherein a plurality of different compensation offset values is provided for said at least two different levels of said measurement reports, and
wherein the compensator is further configured to divide a complete measurement report into sub-reports covering different ones of said resource blocks, wherein each of said at least two different levels covers a different number of said sub-reports.

8. An apparatus according to claim 7, wherein said measurement reports are channel quality reports.

9. An apparatus according to claim 7, wherein said resource blocks correspond to groups of sub-carriers of an orthogonal frequency division multiplexing transmission.

10. An apparatus according to claim 7, wherein said compensator is further configured to use said measurement report to make at least one of a scheduling and link adaptation decision.

11. An apparatus according to claim 7, wherein said compensator is further configured to use said compensation offset for mapping said measurement report into a signal-to-noise ratio.

12. An apparatus according to claim 7, further comprising:
a memory configured to store a plurality of different compensation offset values for said at least two different levels of said measurement reports.

13. An apparatus according to claim 7, wherein said apparatus is a base station device.

14. A system, comprising:
a network element; and
a terminal device configured to transmit at least two different levels of measurement reports,
wherein the network element comprises
a detector configured to detect at least two different levels of measurement reports received from a terminal device of a communication network, each of said at least two levels corresponding to a different amount of resource blocks on which said measurement reports are based; and
a compensator configured to apply to each level of said received measurement reports a compensation offset value selected in response to the detecting,
wherein a plurality of different compensation offset values is provided for said at least two different levels of said measurement reports, and
wherein the compensator is further configured to divide a complete measurement report into sub-reports covering different ones of said resource blocks, wherein each of said at least two different levels covers a different number of said sub-reports.

15. A computer program embodied on a non-transitory machine-readable medium, said computer program configured to control a computer device to:
provide at least two different levels of measurement reports received from a terminal device of a communication network, each of said at least two different levels corresponding to a different amount of resource blocks on which said measurement reports are based;
detect the levels of received measurement reports;
apply to each level of said received measurement reports a compensation offset value selected based on the detected level; and
divide a complete measurement report into sub-reports covering different ones of said resource blocks, wherein each of said at least two different levels covers a different number of said sub-reports,
wherein a plurality of different compensation offset values is provided for said at least two different levels of said measurement reports.

16. An apparatus, comprising:

detecting means for detecting at least two different levels of measurement reports received from a terminal device of a communication network, said levels indicating amounts of resource blocks on which said measurement report is based; and compensation means for applying to said received measurement report a compensation offset value selected in response to the detecting, wherein a plurality of different compensation offset values is provided for said at least two different levels of said measurement reports, and wherein the compensation means is further for dividing a complete measurement report into sub-reports covering different ones of said resource blocks, wherein each of said at least two different levels covers a different number of said sub-reports.

* * * * *